United States Patent [19]
Spohr

[11] 3,847,808
[45] Nov. 12, 1974

[54] METHOD AND APPARATUS FOR TREATING SLUDGE

[76] Inventor: Guenter Spohr, 3473 Manassas Ct., Davidsonville, Md. 21035

[22] Filed: Mar. 27, 1973

[21] Appl. No.: 345,258

[52] U.S. Cl. .................... 210/66, 210/73, 210/271, 210/282, 210/286
[51] Int. Cl. .......................................... B01d 23/24
[58] Field of Search ............ 210/65, 73, 264, 269, 210/270–272, 282, 284, 238, 470, 471, 66

[56] References Cited
UNITED STATES PATENTS

| | | | |
|---|---|---|---|
| 671,684 | 4/1901 | Xander | 210/282 X |
| 630,085 | 8/1899 | Maignen | 210/264 X |
| 1,329,727 | 2/1920 | Smith | 210/282 X |
| 791,647 | 6/1905 | Pfautz | 210/264 X |
| R18,301 | 12/1931 | Peebles | 210/270 |
| 863,092 | 8/1907 | Renn | 210/238 X |
| 630,958 | 8/1899 | Wilson | 210/282 X |
| 3,202,286 | 8/1965 | Smit | 210/286 |
| 671,685 | 4/1901 | Xander | 210/286 X |
| 623,782 | 4/1899 | Hammett | 210/286 X |
| 606,592 | 6/1898 | Snell | 210/286 X |
| R18,970 | 10/1933 | Friend | 210/286 X |

Primary Examiner—John Adee
Attorney, Agent, or Firm—Arthur Schwartz

[57] ABSTRACT

A method and apparatus for treating sludge including a sludge bed of blocks constructed of load-bearing material, a plurality of openings in the blocks, and cartridges filled with filter material positioned in the openings. Scraping the dried sludge off of the blocks without disturbing the filter material in the cartridges.

11 Claims, 6 Drawing Figures

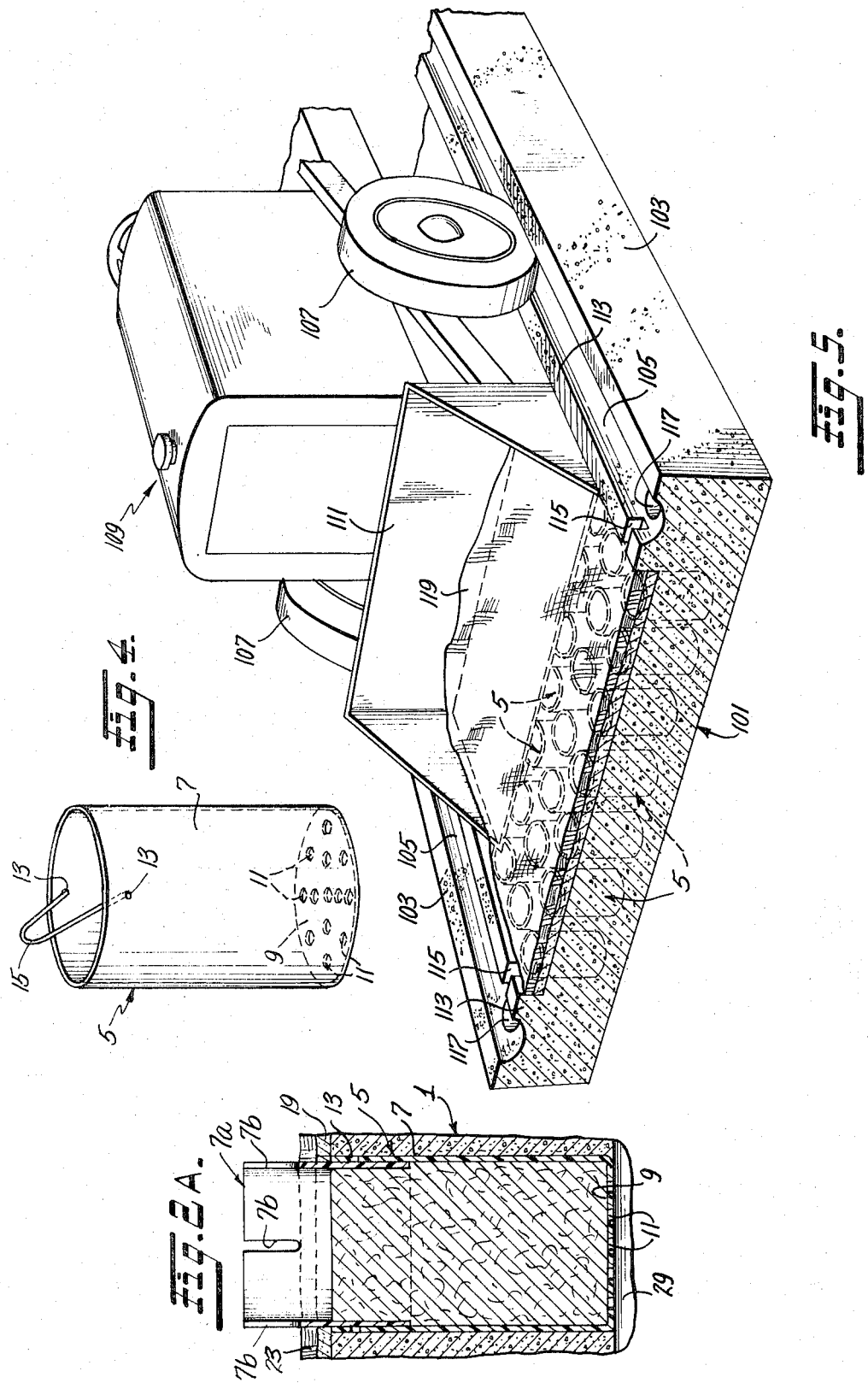

METHOD AND APPARATUS FOR TREATING SLUDGE

BACKGROUND OF THE INVENTION

The present invention relates to the treatment of water, sewage and sludges utilizing the concept of filtration through a filter media imbedded in solid filter blocks. More particularly, the invention relates to a filter for use with processed, digested sludge, as well as a method of filtering the residue of the processed sewage which is either anaerobic or aerobicly digested sludge.

In the treatment of sewage one of the primary stages of treatment includes the separation of solid material by gravity, and this is often followed by anaerobic digestion of the somewhat concentrated sludges. It has been a common practice to first pump the sewage into sedimentation tanks and trickling filters for improvement of the effluent. After the stage of anaerobic digestion, the digested solids are then pumped to a sludge bed which may be covered by a glass housing whereby the sun can continue to dry the sludge. The housing will protect the sludge beds from rain.

The sludge beds are normally composed of a layer of sand over a layer of gravel which in turn may be positioned over another layer of gravel or crushed rock. After a period of time the sludge will dry and must be removed from the sand-gravel bed. Problems have arisen in the past since it is difficult to remove the sludge without disturbing the filter material. Much of this work has had to be done by hand or by expensive machinery operating on rails on the sludge bed. Whatever the method used, the sludge has in the past had to be completely dry; otherwise, the filter material would be disturbed. Also, it has not been possible for workmen to move around very well on the wet sludge.

Another problem of prior art sludge beds is that the bound water, i.e., that water which is entrapped above the sludge, slows down the drying of the sludge material, thus slowing the entire sewage treatment process.

OBJECTS AND SUMMARY OF THE INVENTION

It is an object of the instant invention to provide a filtration system which will permit sludge removal more economically.

Another object of the invention is to provide a sludge bed with means for removing the bound water therefrom.

Still another object of the invention is to provide a sludge bed which is constructed such that heavy equipment can be moved thereover without disturbing the filter material regardless of the moisture content in the sludge.

In one form of the invention a series of partititioned blocks are provided with cartridges filled with filter material such as sand, carbon or other appropriate chemicals. The cartridges can be removed from time to time and the filter material cleaned or replaced. Slots are provided in the edges of the peripheral blocks at various intervals so that the bound water can be drained off.

In another modification, tracks are provided for accommodating the wheels of a frontloader which can move along the bed to scrape off the sludge. Also, a scraper can be pulled by a winch or the like over the bed to remove the dried sludge.

BRIEF DESCRIPTION OF THE DRAWINGS

Other objects and advantages of the present invention will be apparent upon reference to the accompanying description when taken in conjunction with the following drawings wherein:

FIG. 2a is a sectional view of a modified bound water drain;

FIG. 4 is a perspective view illustrating an empty cartridge in accordance with the invention; and FIG. 5 is a perspective view showing another modification of the filter bed having means for supporting a frontloader.

DETAILED DESCRIPTION OF THE INVENTION

Figure 1:
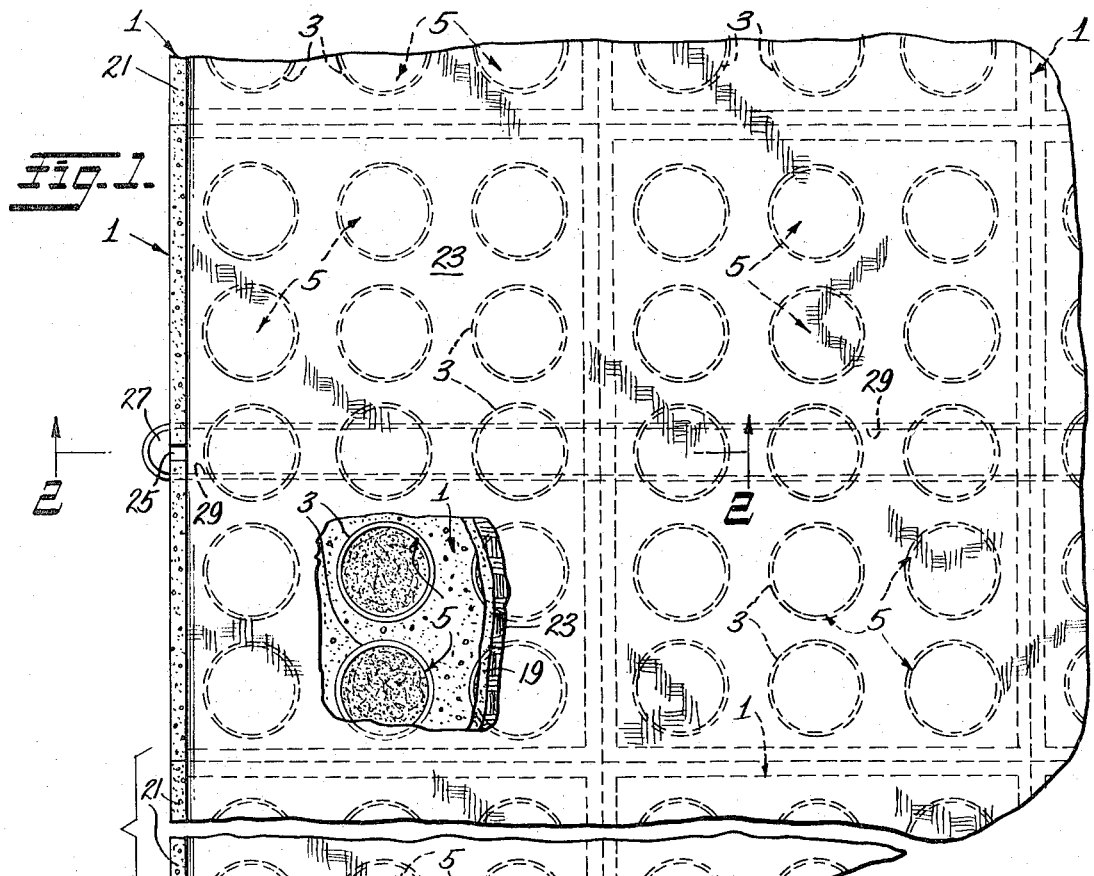
FIG. 1 is a plan view with a portion partially broken away of a filter bed of the instant invention.
Figure 3:
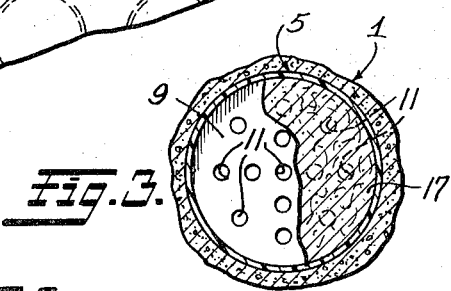
FIG. 3 is a section view illustrating the bottom of a cartridge taken along lines 3—3 of FIG. 2.

Referring noW to FIGS. 1-4 the filter bed is seen composed of a plurality of blocks 1 having circular openings 3 therein. The blocks 1 are composed of material such as concrete which is designed and engineered to withstand the anticipated load of motorized loading and transporting equipment having the ability to move around freely on the total area of the sludge bed.

Positioned within the openings 3 are a plurality of cartridges 5 made of metal or plastic material. The cartridges 5 have a cylindrical side wall 7 and a bottom wall 9 with a plurality of perforations 11 therein. The side wall 7 may also have a pair of perforations 13 adjacent the top edge thereof. The perforations 13 are designed to receive a hook-like tool member 15 which may be of wire and positioned within the openings 13 in the same manner as bucket handles are spring inserted into openings in the sides of a bucket. In this manner a workman can periodically remove the cartridge to change or clean the filter materials.

Figure 2:
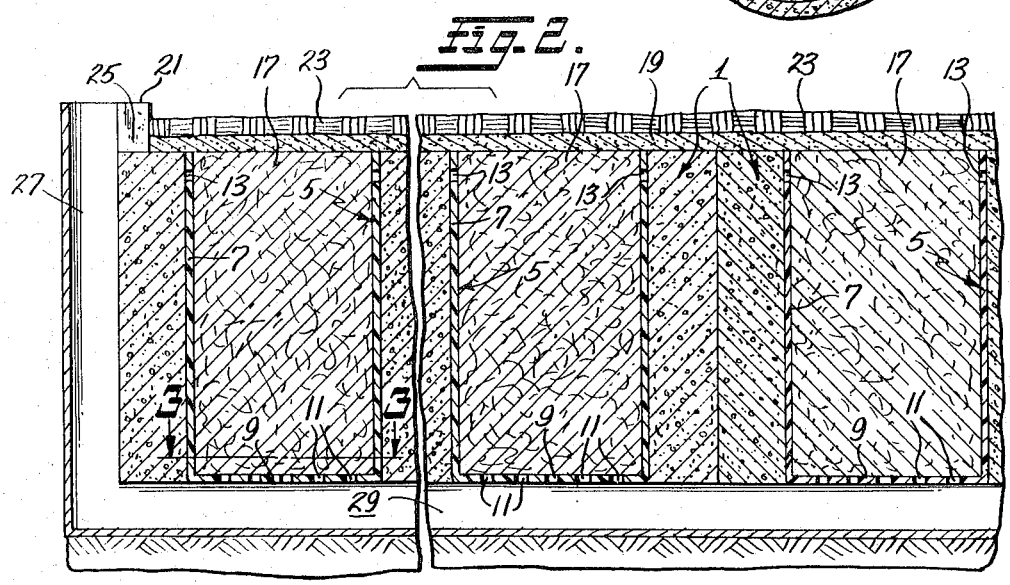
FIG. 2 is a sectional view taken along lines 2—2 of FIG. 1 illustrating the filter bed.

Positioned in the cartridge 5 is an appropriate filter material 17 which may be of sand, carbon, gravel, magnesia or other appropriate chemical or combination thereof. The filter material 17 is designed to allow the water to drain therethrough and out the openings 11. There may also be a very thin layer of sand 19 (in the order of an inch or less) positioned above the cartridges and within the upstanding side walls 21 along the outer periphery of the bed; however, this overlayer is not necessary. In FIGS. 1 and 2 a layer of sludge 23 is seen covering the sand layer.

In order that the bound water can be readily drawn off of the sludge bed a plurality of slot 25 are provided at about ten foot intervals along the outer upstanding edge 21. The water drawn off through the slots 25 can pass down an outside channel 27 and through coke or other heavy coarse filter material to a drain 29 positioned under the bed. With this arrangement air passing down channel 27 and along drain 29 will assist in the drying process since it will be drawn up through the cartridges by a chimney effect.

Ideally, the blocks 1 are of dimensions of about 40 centimeters (15¾ inches) by 60 centimeters (23 ¾ inches) and have a minimum height of 15 centimeters (6 inches). The compartmentized blocks ideally would have three or four compartments along the narrower side and five or six compartments along the longer side, thus having between 15 and 24 compartments per block. The drawings include fifteen compartments per block for ease of illustration; however, in practice it is desirable to have, obviously, as much filter space as possible. Therefore, the compartments would ideally be closer together than illustrated and be of about 9 centimeters in diameter. Also, it is important to note that the top of each cartridge must not project above the top of the compartmentized block thereby providing obstruction to a scraping mechanism.

An obvious modification of the invention would be to merely place the filter material within the compartment openings without the requirement of the cartridges. The cartridges, however, provide the added facility of being able to easily change or clean the filter material.

It will be appreciated that the above-described invention of the compartmentized block arrangement can be incorporated in existing facilities by merely removing the present filter matreial and positioning the blocks in its place. On the other hand, it could obviously be installed in newly-built facilities.

From an economical standpoint the invention has the advantage, as will be appreciated from the discussion above that the facility can accommodate more frequent drawing of the sludge on the sand surface. One of the reasons for this is that the outer peripheral slots 25 the bound water will be removed or drawn off more rapidly. Secondly, the upper surface can be scraped sooner without losing any of the filter material with the scraping. In other words the sludge can still be in a semi-liquid state; whereas, in the prior art one would have to wait for the sludge to dry before the workmen could go in and scrape it off with handtools. Otherwise, the workmen would probably dig down into the sand.

As illustrated in FIG. 5, a block arrangement 101 has a plurality of cartridges 5 therein. The construction of the block 101 and the filters 5 are the same as discussed above. On the periphery of the blocks are a pair of upstanding wall members 103 which have tracks 105 therein to receive wheels 107 of a front-end loader 109. The front-end loader 109 has a front scoop 111 of a width substantially equal to the distance between a pair of inner edges 113 on the side walls 103. The inner edges 113 have slots 115 which are equivalent to the slots 25 in FIG. 1 to facilitate removal of the bound water. The slots 115 cooperate with drains 117 comparable to drains 27 in FIG. 1.

The front-end loader with scoop 111 can move along the tracks 105 to scrape off the sludge 119.

An alternative to the modifications illustrated includes a scraper or plurality of scrapers which can be pulled by a winch back and forth between the guide rails 103.

A modification seen in FIG. 2a illustrates an alternative to the bound water drains 25 and 27 in FIGS. 1 and 2 and 115 and 117 in FIG. 5. Instead of providing the slots and drains external to the bed, one of the cartridges 5 along the outer periphery every 10 feet or so may have a cylindrical member 7a positioned therein and extending above the sludge. One or more slots 7b are provided in the wall of member 7a to allow entry of the bound water, thereby utilizing the bed area itself without the need for bound water drains external to the bed. Obviously, the scraping apparatus will not be permitted to contact the upstanding members 7a. These members 7a are vertically movable and adjustable in height to accommodate for changes in the depth of the sludge and bound water. Further, the cartridges used as drains are filled with a more coarse filter media than are the other cartridges.

Finally, while circular openings and cartridges have been illustrated, it will be appreciated that any configuration—such as squares, rectangles, etc.—could be used. The important point of the invention is that the blocks forming the beds have as much filter area as possible, keeping in mind that the concrete or other material of which the blocks are formed must be strong enough to support a vehicle doing the scraping.

A method and apparatus has thus been provided which will facilitate the removal of sludge by providing compartmentized blocks with filters positioned therein whereby heavy equipment can be moved thereover to remove the sludge. At the same time bound water can be easily removed thus speeding the drawing process and more economically utilizing the sludge bed.

While several embodiments of the invention have been described, it will be understood that it is capable of many further modifications, and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and which fall within the scope of the invention or the limits of the appended claims.

What is claimed is:
1. A sludge drying bed comprising:
    a. a block of material having a top surface and being capable of supporting a heavy load thereon and having a plurality of openings extending therethrough,
    b. a cartridge positioned in each opening and filter material positioned in each cartridge, openings.
    c. the tops of said cartridges extending at least close to but no higher than the top surface of said block,
    d. said cartridge further being substantially open at the top and sufficiently closed at the bottom to retain the filter material therein, and openings in said bottom whereby water and the like can drain therethrough,
    e. an outer peripheral edge extending substantially above the top of the cartridges to retain sludge and water therein, and a slot in said peripheral edge whereby bound water can flow off the retained sludge, and
    f. means for scraping the sludge off said block without disturbing the filter material in said cartridges.

2. A filter as defined in claim 1 including a plurality of said blocks positioned adjacent one another.

3. A filter as defined in claim 1 including drain means associated with said slots to receive the bound water flowing through said slots.

4. A filter as defined in claim 1 wherein said cartridges include means for facilitating their removal.

5. A filter as defined in claim 4 wherein said facilitating means includes a pair of openings in a wall of the cartridge for receiving a lifting handle inserted therein.

6. A filter as defined in claim 1 including track means on said block for receiving a vehicle having thereon means for scraping the sludge.

7. A filter as defined in claim 1 including at least one additional cartridge extending above the remainder of said cartridges, said additional cartridge being provided with at least one slot in the extended wall area to receive bound water flowing off the top of the sludge.

8. A method of filtering sewage material and removing sludge therefrom comprising:
   a. providing a sludge drying bed of heavy load-bearing material,
   b. placing a large number of openings in said bearing material, the tops of said openings extending no higher than said drying bed,
   c. placing filter material in said openings,
   d. flowing said sludge onto said bed,
   e. allowing said sludge to at least partially dry,
   f. removing the bound water accumulated above the sludge being dried,
   g. scraping the at least partially dried sludge from said bed without disturbing the filter material in said openings.

9. A method as defined in claim 8 including placing the filter material in cartridges in the openings.

10. A method as defined in claim 9 including the step of removing the cartridges from the openings and changing the filter material therein.

11. A method as defined in claim 8 wherein said scraping step is performed by an occupant driven vehicle moving over the bed.

* * * * *